US012573219B2

(12) United States Patent
Christiaens

(10) Patent No.: US 12,573,219 B2
(45) Date of Patent: Mar. 10, 2026

(54) DEVICE AND METHOD FOR COUNTING AND IDENTIFICATION OF BACTERIAL COLONIES USING HYPERSPECTRAL IMAGING

(71) Applicant: Micro TechniX, Sint-Niklaas (BE)

(72) Inventor: Wouter Christiaens, Sint-Niklaas (BE)

(73) Assignee: Micro TechniX, Sint-Niklaas (BE)

( * ) Notice: Subject to any disclaimer, the term of this patent is extended or adjusted under 35 U.S.C. 154(b) by 127 days.

(21) Appl. No.: 18/564,958

(22) PCT Filed: May 31, 2022

(86) PCT No.: PCT/IB2022/055082
§ 371 (c)(1),
(2) Date: Nov. 28, 2023

(87) PCT Pub. No.: WO2022/254332
PCT Pub. Date: Dec. 8, 2022

(65) Prior Publication Data
US 2024/0290115 A1      Aug. 29, 2024

(30) Foreign Application Priority Data

Jun. 1, 2021    (BE) .................................. 2021/5437

(51) Int. Cl.
*G06V 20/69*         (2022.01)
*G06V 10/143*        (2022.01)
*G06V 10/774*        (2022.01)

(52) U.S. Cl.
CPC .......... *G06V 20/698* (2022.01); *G06V 10/143* (2022.01); *G06V 10/774* (2022.01); *G06V 20/693* (2022.01)

(58) Field of Classification Search
CPC .................................................... G01J 3/2823
See application file for complete search history.

(56) References Cited

U.S. PATENT DOCUMENTS

| | | | | |
|---|---|---|---|---|
| 2002/0155617 | A1* | 10/2002 | Pham | ................... G01N 33/542 |
| | | | | 422/547 |
| 2005/0061967 | A1* | 3/2005 | Shvartsburg | ............ H01J 49/04 |
| | | | | 250/288 |

(Continued)

FOREIGN PATENT DOCUMENTS

| | | |
|---|---|---|
| CA | 3 057 409 A1 | 9/2018 |
| WO | 2012/152768 A1 | 11/2012 |
| WO | 2013/093913 A1 | 6/2013 |
| WO | 2022/254332 A1 | 12/2022 |

OTHER PUBLICATIONS

ISR-WO dated Oct. 28, 2022 for PCT/IB2022/055082 (WO/2022/254332).

(Continued)

*Primary Examiner* — Frank Johnson
(74) *Attorney, Agent, or Firm* — IPSILON USA, LLP

(57) ABSTRACT

An invention disclosing a device and method for the counting and identification of bacterial, mold or yeast colonies based on hyperspectral image capture and processing. A device for acquisition of hyperspectral images comprising camera capable of hyperspectral imaging, a hole inspection lens array and a light source arranged in or around a light housing is described. A method comprising a deep learning algorithm is made available for the processing of acquired hyperspectral data in order to detect, identify and count bacterial, mold or yeast samples contained within a Petri dish. In particular, the use of a hole inspection lens array allows acquisition of hyperspectral images of the complete inner surface of a Petri dish which, combined with the use of a deep learning algorithm ensure a high level of accuracy and sampling frequency.

18 Claims, 4 Drawing Sheets

(56) References Cited

U.S. PATENT DOCUMENTS

Figure 1:
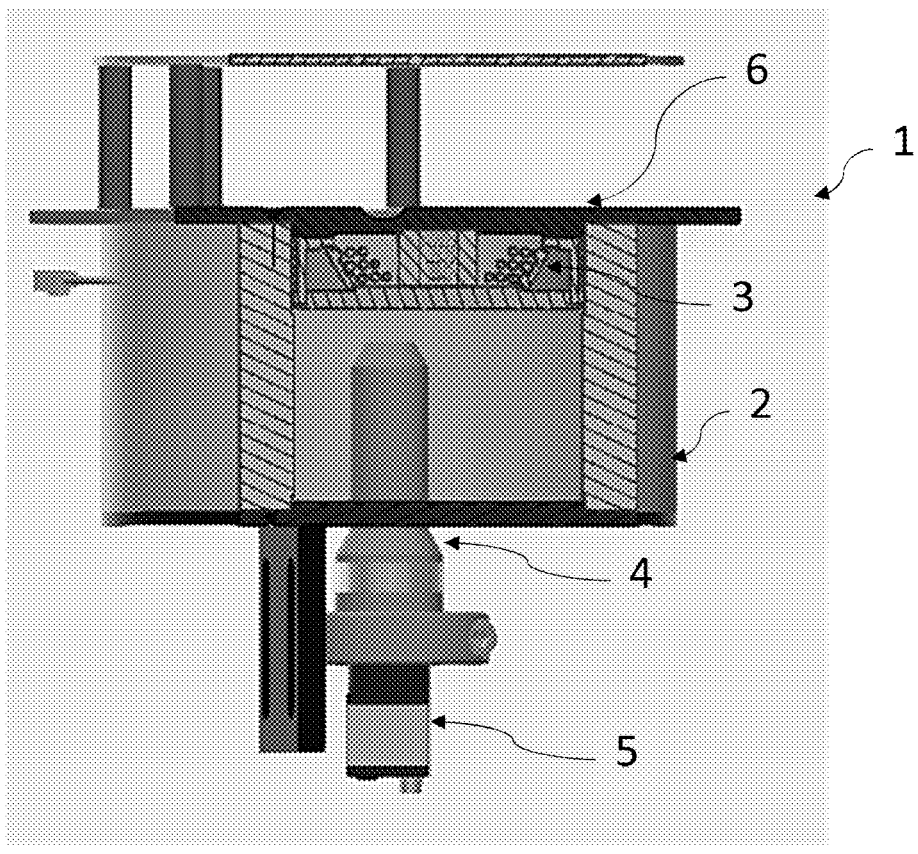

| 2013/0087700 | A1* | 4/2013 | Alusta | ................. | H01J 49/0409 |
|---|---|---|---|---|---|
| | | | | | 250/282 |
| 2014/0378843 | A1* | 12/2014 | Valdes | ................... | A61B 1/063 |
| | | | | | 600/476 |
| 2018/0188286 | A1* | 7/2018 | Meyer | ..................... | G01Q 30/18 |
| 2019/0287149 | A1* | 9/2019 | Papp | ..................... | G06Q 20/322 |
| 2019/0287222 | A1* | 9/2019 | Cutrale | .................. | G02B 21/08 |
| 2022/0351005 | A1* | 11/2022 | Fong | .................... | G06V 10/143 |
| 2023/0060037 | A1* | 2/2023 | Ozcan | .................. | G03H 1/0005 |

OTHER PUBLICATIONS

Masschelein B. et al., "Towards a colony counting system using hyperspectral imaging", Algorithms and Technologies for Multispectral, Hyperspectral, and Ultraspectral Imagery XIX—Proceedings of SPIE, vol. 8225, Feb. 8, 2012 (Feb. 8, 2012), p. 822510.
Turra Giovanni et al, "CNN-Based Identification of Hyperspectral Bacterial Signatures for Digital Microbiology", Oct. 13, 2017 (Oct. 13, 2017), SAT 2015 18th International Conference, Austin, TX, USA, Sep. 24-27, 2015; [Lecture Notes in Computer Science; Lect.Notes Computer], Springer, Berlin, Heidelberg, pp. 500-510.
Kobayashi et al,; "Real-time optical monitoring of microbial growth using optimal combination of light-emitting diodes," Optical Engineering 51 (12) 123201 (Dec. 2012).
Mehrubeoglu et al; "Differentiation of bacterial colonies and temporal growth patterns using hyperspectral imaging;" Image Spectrometry, SPIE vol. 9222 (2014).

* cited by examiner

DEVICE AND METHOD FOR COUNTING AND IDENTIFICATION OF BACTERIAL COLONIES USING HYPERSPECTRAL IMAGING

FIELD OF INVENTION

The invention related to devices and/or methods for detection, identification and/or counting of viable and non-viable particles of environmental monitoring. In particular this invention relates to devices and methods for detection, identification and/or counting of viable and non-viable particles of environmental monitoring by means of hyperspectral imaging.

BACKGROUND

Analysis of viable and non-viable particles of environmental monitoring, such as bacterial colonies, yeast, mold and inorganic particles, is a fundamental activity within pharmaceutical companies. Such an activity is usually time consuming and requires clean conditions in order to avoid the contamination of said cultures. Today, bacterial, mold or yeast culture analysis is still carried out in a mostly manual fashion. WO2013093913A1 discloses a method for spectroscopic detection and identification of microorganisms in a culture. This method combines spectral image acquisition with a learning algorithm in order to expedite the analysis of a bacterial culture.

CA3057409A1 discloses a device for the detection and classification of pathogens, comprising a plurality of light sources to emit excitation radiation towards a bacterial sample and a detector to capture fluorescence, reflectance and transmittance coming from said sample. Furthermore, a machine learning algorithm may be used to build a pathogen detection model and to effectuate said pathogen detection.

The aforementioned documents provide examples of the of devices and methods for the detection and identification of microorganism cultures, by means of spectral image capturing and processing. However, none of these devices or methods is specifically directed towards the detection and identification of microorganisms contained in Petri dishes.

WO2012152768A1 discloses a device for image acquisition of microorganism colonies within a Petri dish. The disclosed device comprises multiple illumination sources with different incidence angles relative to the Petri dish and an image capturing element.

The aforementioned device is directed specifically towards imaging of microorganism cultures contained in Petri dishes. However, any data concerning the side walls of the Petri dish is deliberately removed from the captured image data.

Kobayashi et al. discloses a system for real-time optical monitoring of microbial growth, the system consisting of a CMOS camera and two light-emitting diodes with a constant temperature incubator. However, the optical elements of the system are kept on the outside of constant temperature incubator, therefore, the access of said optical elements to the interior of a Petri dish under examination is reduced.

Mehrubeoglu et al. discloses a hyperspectral imaging system comprising a spectrometer equipped with a CCD camera, LED ring light, focusing lens and a sample holder configured to be movable horizontally as well as vertically. However, consistent imaging of a sample depends on how precisely the sample holder can be positioned each time imaging of a sample is carried out.

The abovementioned methods and devices present a number of advantages relative to manual analysis of bacterial cultures. Acquisition of light spectra produced by bacterial samples and its analysis by means of artificial intelligence algorithms can yield significant benefits in terms of speed and accuracy. However, methods and devices capable of imaging and analyzing the whole inside surface of a Petri dish are still missing in prior art. In particular, the capability to acquire and analyze images of the walls of a Petri dish which, may reveal bacterial, mold or yeast colonies that would otherwise remain undetected.

SUMMARY

The object of the present invention is to overcome, at least partly, the drawbacks mentioned above by making available a method and device suitable for the acquisition of hyperspectral images of bacterial colonies, yeast, mold and inorganic particles in Petri dishes. Said device comprising a light housing with a light source, camera capable of hyperspectral image acquisition equipped with a lens array, wherein, said lens array is a hole inspection lens device. In this context, a hole inspection lens array is defined as a lens array capable of imaging the inner walls and the bottom of a cavity.

Hyperspectral imaging consists in the acquisition of a spectrum for each pixel in an image. The information collected by hyperspectral imaging is typically stored as a cube. It is yet another object of this invention to make available a method suitable for the interpretation of acquired hyperspectral images, in particular for the detection, counting and identification of bacteria, yeast or mold cultures inside a Petri dish. It is a particular object of the present invention to make available a device and method which, though capable of high accuracy in the detection, identification and counting of bacterial, yeast or mold colonies inside a Petri dish, requires minimal operator intervention.

It is yet another object of the present invention to make available a device with means of holding a Petri dish which, compared to prior art, reduces the possibility of condensation inside said Petri dish.

It is yet another object of the present invention to make available a device capable of illuminating the inner surface of a Petri dish in its totality.

It is yet another object of the present invention to provide a device and method that allows for higher sampling frequency.

These objects, and other which will appear more clearly below, are achieved by a hyperspectral imaging device and method for the detection, identification and counting of bacteria, fungi and other microbiological entities in accordance with the following claims that must be considered as an integral part of the present patent. In particular, the hyperspectral imaging device operates on Petri dishes which may be of round or square shape. Furthermore, multiple dimensions of Petri dishes can be used with the hyperspectral imaging device with no detriment to the accuracy or speed of the analysis.

A first aspect of the invention according to claim 1 relates to a method for the detection identification and monitoring of bacteria, mold or yeast colonies inside a petri dish. The method comprises a machine learning algorithm for classification of the hyperspectral data collected by means of the imaging device. In particular, a supervised deep learning algorithm is trained for the detection, identification and counting of colonies of bacteria, mold or yeast inside a Petri dish. In this way, high accuracy of the results is made possible. This high accuracy is enhanced by the consistent quality of the images acquired by means of the hyperspectral imaging device. Furthermore, the use of the deep learning algorithm enables a faster processing of hyperspectral data, enabling higher sampling frequencies.

The sampling frequencies can be managed manually or by software. This, in combination with the automatic management and processing of hyperspectral data allowed by the deep learning algorithm, can reduce operator intervention. In this way, errors in the results due to human participation are, advantageously, mitigated. Furthermore, cognitive load of the operator is also reduced.

Imaging data of each sample is automatically grouped and ordered chronologically. In this way, a time lapse documenting the evolution of a sample can be produced. This permits, advantageously, an easier interpretation of the data provided to the operator. Furthermore, a time lapse of the images permits, advantageously, the monitoring of said samples.

A second aspect of the invention according to claim 10 relates to a device suitable for the acquisition of hyperspectral images of bacterial, mold or yeast colonies in Petri dishes. The device comprises a light housing equipped with a base on its upper surface, such that a Petri dish can be placed upon it with a top-down orientation. In this way, condensation that would otherwise inhibit reliable imaging of the inside of the Petri dish can be avoided. In the same way, consistent placement of the Petri dish relative to other elements attached to the light housing is ensured. Also provided is a light housing, said light housing being further provided with an annular upward oriented light source capable of illuminating of the interior of a Petri dish in its entirety. In particular, said light source is equipped with a plurality of LEDs with a wavelength between 400 nm and 1700 nm. In this way, and combined with the consistent placement of the Petri dish made possible by the base, consistent illumination of the complete interior of a Petri dish can be attained during all sampling events. The device further includes a camera capable of capturing hyperspectral images is equipped with a hole inspection lens array. Hole inspection lens arrays are defined as a lens array capable of imaging the inner walls and the bottom of a cavity. In this way, acquisition of hyperspectral imaging of the whole inner surface of a Petri dish is made possible. The hole inspection lens array and the camera, being slidably attached to the light housing, allow for the acquisition of hyperspectral data in which positioning and lighting of a petri dish remains consistent during all sampling events.

FIGURE DESCRIPTION

Figure 2:
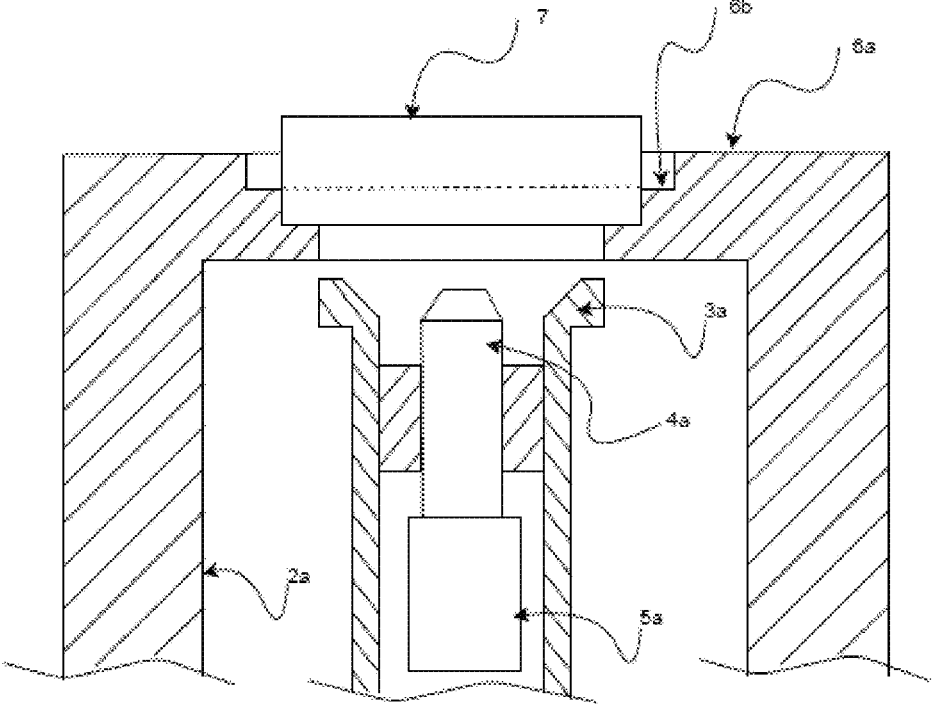
Figure 3:
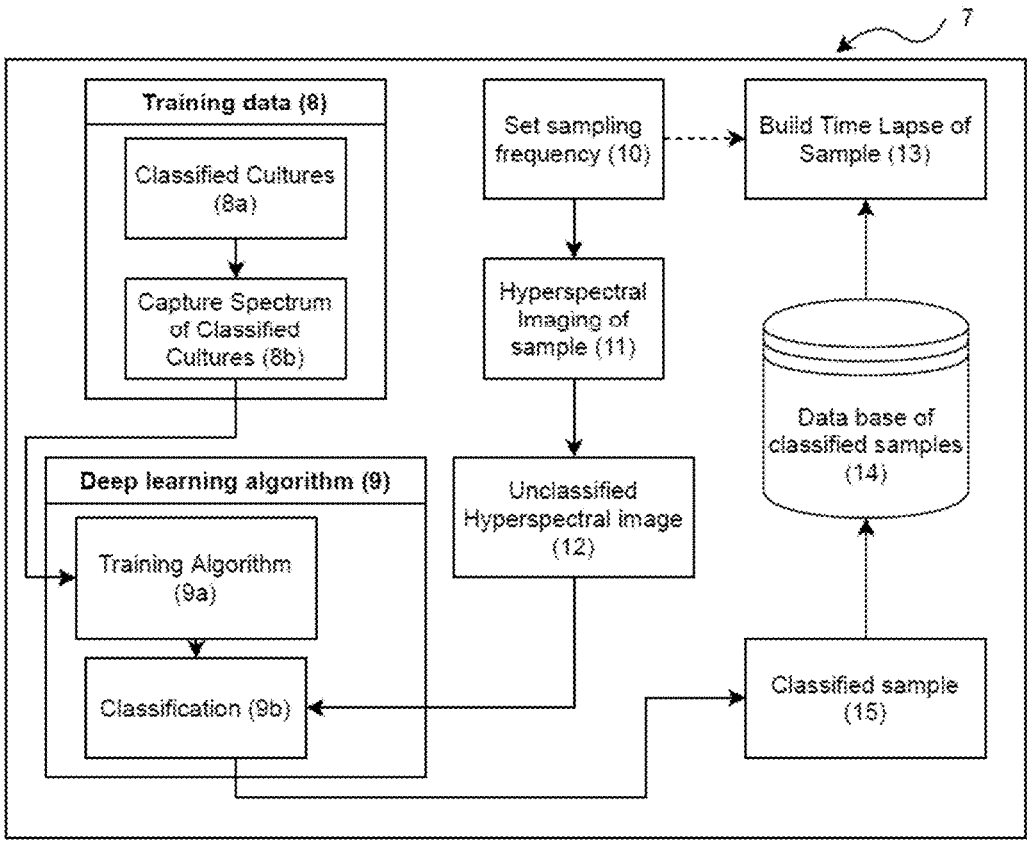
Figure 4:
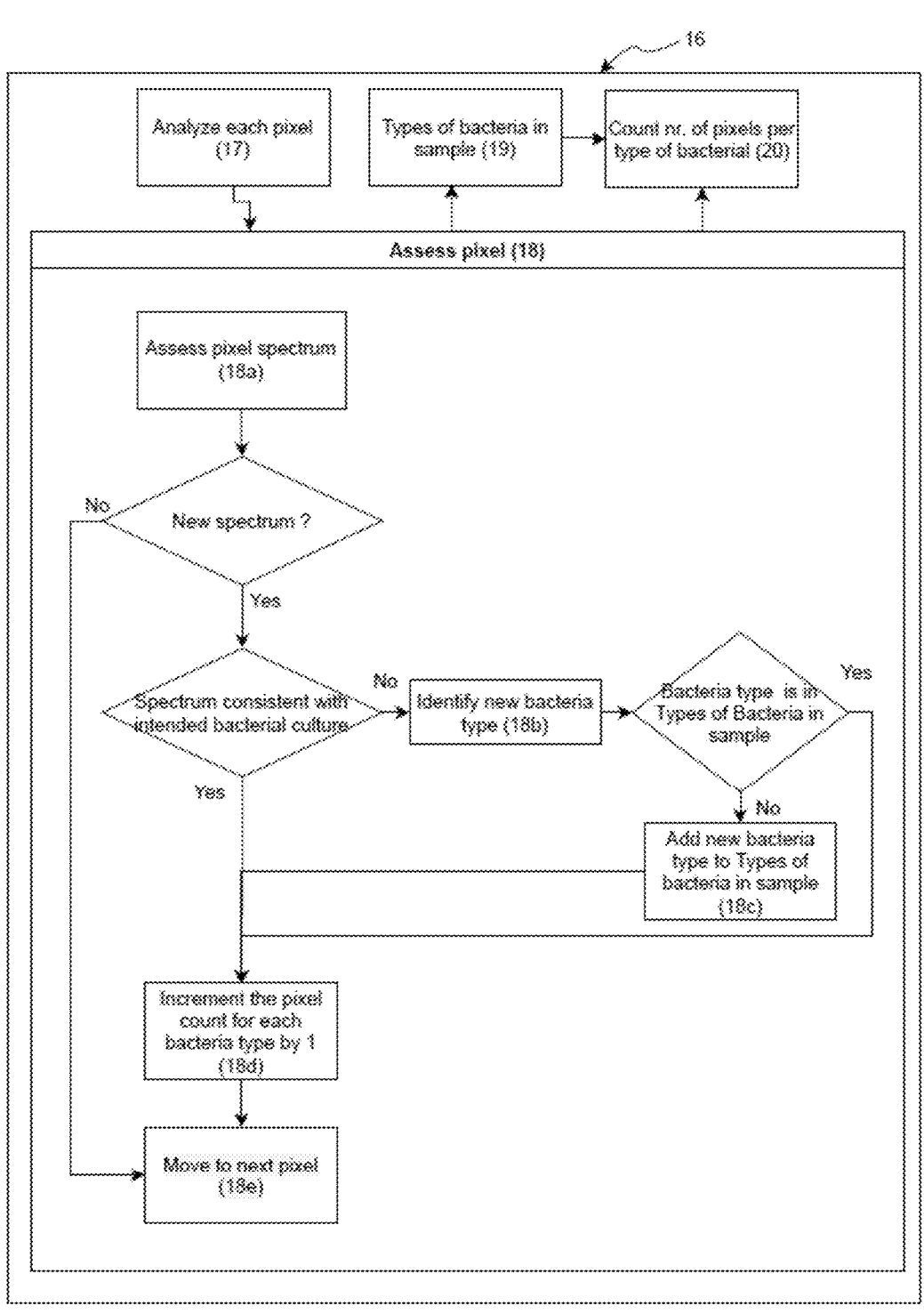

FIG. 1 depicts a section drawing of the device
FIG. 2 depicts a Petri dish placed onto the stepped base
FIG. 3 depicts elements of the method.
FIG. 4 depicts the decision model for the detection, identification and counting of a culture of bacteria, mold or yeast.

DETAILED DESCRIPTION

The present invention concerns a device and method of using the same for the detection, counting and identification of bacterial, mold and/or yeast colonies contained in a Petri dish. The method makes advantageous use of a novel arrangement of a device for hyperspectral imaging, and further comprises the use of a deep learning algorithm for the processing, storing and display of the captured data.

"Petri dish", "Petri dish" or "dish" are to be understood as an all-encompassing term for all plastic or glass dishes, scales or box like containers suitable to contain cultures of bacteria, mold or yeast.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any $\geq 3$, $\geq 4$, $\geq 5$, $\geq 6$ or $\geq 7$ etc. of said members, and up to all said members.

A first aspect of the invention relates to a method for algorithm for the detection, identification and counting of bacterial, mold and yeast colonies inside a Petri dish. In particular, said method includes the training and use of a deep learning algorithm for the detection, identification and counting of bacterial, mold and yeast colonies inside a Petri dish.

The elements integral to the method of the present invention are presented in FIG. 3. A first aspect of this figure is the training 9a of a deep learning algorithm 9, in particular by means of a training dataset 8. To obtain said dataset, a number of pre-classified samples 8a are used. In order to increase the accuracy and scope of use of the algorithm 9, a high number of sample images is necessary. Preferably, the set of samples should include as many types of bacteria, mold or yeast as possible. More preferably, the set of samples should include several types of growth medium, such as but not limited to nutrient agar, plate count agar, trypticase soy agar, blood agar, MacConkey agar, Mannitol agar. More preferably, the set of samples should include combinations of the bacteria, mold or yeast types with different types of growth medium. Yet more preferably, an additional number of samples combining multiple bacterial cultures and/or molds and/or yeast should be provided.

In order to carry out the training (9a) of the algorithm 9, a hyperspectral image 8b of each sample is obtained. Preferably, said image would be obtained using Petri dishes of different sizes and shapes. More preferably, imaging of each sample should be obtained under varying light conditions e.g. angle of incidence, ambient light etc. The hyperspectral images 8b of each training sample are then provided in the form of hyperspectral cubes which are subsequently provided to train the algorithm 9. After providing the algorithm 9 with sufficient training samples, the algorithm can be used for the classification 9b of newly acquired samples.

In this context, a "hyperspectral cube" or "hyperspectral image" are to be understood as a multi-dimensional array of values. In this particular case, the pixels in an image form a two dimensional data array. Each pixel is further provided with another dimension wherein, the spectral bands reflected from said pixel are represented. The use of a diversified set of samples and the diverse conditions under which hyperspectral imaging of said samples is carried out allows, advantageously, the classification 9b of newly acquired unclassified sample images (12) under a greater variety of circumstances. The classification 9b of the unclassified sample images 12 starts with the setting of a sampling frequency (10). This sampling frequency can be determined either by the operator or by means of software. The sampling frequency will depend on the number of samples to be analyzed in the same run.

Once the sampling frequency is set, the collecting of a hyperspectral image (11) of each sample is carried out by irradiating each sample with light within a band of 400 nm to 1700 nm, by preference 450 nm to 1600 nm, 500 nm to 1550 nm, 600 nm to 1500 nm, 660 nm to 1450 more preferably 800 nm to 1400 nm or most preferably 850 nm t0 1700 nm, while a camera registers the spectra reflected by the sample. During this process, a hyperspectral cube is created, wherein, each pixel comprising the image is assigned a spectrum. Here, the deep learning algorithm 9 allows, compared to human-based methods, a faster reading of the information dense hyperspectral cubes of each sample.

A decision model 16 making use of the deep learning algorithm 9 is presented in FIG. 4. This decision model 16 starts with an assessment of each pixel (18) comprising the hyperspectral image of a bacterial, mold or yeast culture. In particular, the spectrum of each pixel is analyzed (18a) for new spectra. The changes in the spectrum of a pixel denotes a change in the types of bacteria, mold or yeast present in said pixel. In particular, the occurrence of new spectra within a pixel denote the growth of at least one type of bacteria, mold or yeast.

According to the decision model provided in FIG. 4, if a new spectrum is detected, the new spectrum is analyzed by means of the deep learning algorithm in order to detect which new type or types of bacteria, mold or yeast are present (18b). Here, a distinction is made between the bacterial, mold or yeast sample intended to be grown in the sample and those other bacteria, molds or yeasts that are considered invasive. If a new bacteria, mold or yeast type is identified, said bacteria, mold or yeast type is registered (18c) by adding it to set 19 containing the types of bacteria, mold or yeast in sample. Once all types of bacteria, mold or yeast present in the pixel are identified, the count of the number of pixels per bacteria, mold or yeast type is incremented (18d) according to the types of bacteria, mold or yeast found in the spectrum of the pixel. The analysis continues for the next pixel (18e) comprising the hyperspectral image until there are no more pixels left to be analyzed.

Once this happens, each type of bacteria, mold or yeast is counted (20). This is done for each bacteria, mold or yeast type by counting the number of pixels in which they detected. Therefore, the decision model presented in FIG. 4 permits, advantageously, not only the detection but the monitoring of the evolution of each type of bacteria, mold or yeast occurring in a Petri dish. The information thus obtained is then chronologically organized and stored in order to, advantageously, facilitate visualization by the operator.

In a preferred embodiment of the present invention, the sampling frequency can be automatically adjusted, if the number of samples to be analyzed permits, according to the speed at which the bacterial, mold or yeast cultures evolve. More preferably, the sampling frequency for a particular Petri dish increases if the colonies are evolving faster. In a still more preferable embodiment of the invention, the sampling of each Petri dish may be rescheduled by prioritizing fast growing cultures.

The present invention makes available a device capable of hyperspectral imaging which provides, compared to prior art, a number of advantages with will become evident in the following embodiments. A particular advantageous aspect of this invention is the use of a hole inspection lens array. During the preparation of a Petri dish containing a microorganism sample, agar is poured onto the inner surface of the Petri Dish. As the agar is poured into the petri dish, surface tension causes the agar to crawl up the side of the dish. This often results in colonies being formed on the side of the inner wall of the petri dish and these objects are not visible with normal macro—or telecentric lenses. Without the use of a hole inspection lens array, colonies formed on the inner sides of the lateral walls of the dish would go unnoticed.

In a preferred further embodiment, the device is an integral part of a machine capable of managing and locating Petri dishes onto the base of the device. In another preferred embodiment of the present invention, the device can be used on its own as presented in FIG. 1.

A further or another embodiment of the present invention is presented in FIG. 2, wherein, the light source 3a, lens array 4a and camera 5a are in slidable attachment with a light housing 2a. In a preferrable embodiment of the invention, the light source 3a is also in sliding attachment relative to the lens array 4a. In particular, in this preferrable embodiment of the invention, the light source 3a, lens array 4a and camera 5a are arranged such that they are in substantial axial alignment among them. In a yet more preferable embodiment of the present invention, the light housing 2a is provided with a Petri dish base 6a built onto its top surface. In a still more preferable embodiment of the invention, said base 6a is provided with both round and square shaped cavities 6b on its surface and in substantial alignment with the light source 3a, lens array 4a and camera 5a.

In a further preferred embodiment of the present invention, all elements of the device are provided in substantial axial alignment with each other. Preferably, the light source 3 is provided in substantial axial alignment with the lens array 4 and the camera 5.

In a yet further or another preferred embodiment of the device of the present invention, the device is arranged such that the light source 3, lens array 4 and camera 5 are oriented upwards. Preferably, the light source 3, lens array 4 and camera 5 are located inside the light housing 2. More preferably, the light source 3, lens array 4 and camera 5 are arranged relative to the light housing 2, such that the distal end of the lens array 4 does not protrude above the upper surface of the light housing. 2 In a yet more preferable embodiment of the present invention, the lens array 4 is arranged relative to the light housing 2, such that the distal end of said lens array 4 is below the upper surface of the light housing 2.

In a further preferred embodiment of the present invention, the light source 3, lens array 4 and camera 5 are arranged below the upper surface of the light housing 2, where in a base 6 for a Petri dish forms an integral part of said light housing 2. In a more preferrable embodiment of the present invention, the base 6 for the Petri dish is provided built onto the upper surface of the light housing 2. In a yet more preferrable embodiment of the invention, the Petri dish base 6 is built with its center substantially aligned with the axis of the lens array 4.

The features of the last preferrable embodiment of the present invention permit, advantageously, the placement of Petri dishes 7 of both square and round shape and of different sizes upon the base 6a. In particular, the substantial axial alignment between the square and round shaped cavities 6b of the built in base and the lighting source 3a, lens array 4a and camera 5a, permits an advantageous alignment of said elements with the Petri dishes 7.

In a further preferred embodiment presented in FIG. 2, the square and round cavities 6a disclosed with the previous embodiment are provided in different sizes, preferably in a stepped construction, descending from largest to increasingly smaller apertures. More preferably, the last aperture built onto the base for Petri dishes is substantially smaller than the smallest Petri dish and is a through hole, such that the distal end of the lens array is exposed.

The base 6a presented in FIG. 2 may have one, two or more steps. Each step may have a depth between 0.5 mm and, but not limited to, 2 mm. The inner perimeter of each step may be chamfered or substantially rectangular. The light source 3a and the lens array 4a are provided slidably movable relative to each other along their longitudinal axis. Both these elements are provided, slidably movable relative to the stepped base 6a for the Petri dish. The slidable arrangement of these elements can be used, advantageously, to compensate for the use of different sizes of Petri dishes 7, as these will be placed at different heights according to the most compatible step. In this way, proper illumination can be provided for every size of Petri dish. Also the adjustable position of the hole inspection lens array 4a relative to the stepped base 6a allows, advantageously to overcome occlusion by the base 6a and/or the light source 3a. This adjustability also allows for the compensation in possible focus limitations of the lens array 4a.

In a further preferred embodiment of the invention, during the hyperspectral imaging of each sample (11), and in particular when different samples in different petri dishes must be analyzed, the position of the lens array 4a and light source 3a are adjusted relative to the base 6a. This is done in accordance with the position of the aforementioned elements during the last hyperspectral imaging of the same sample. In this way, it is ensured that said hyperspectral imaging occurs under the same sight and focus conditions in every instance for the same bacterial, mold or yeast culture.

In a more preferred further embodiment, the algorithm can be used to determine the ideal positioning of the lighting element 3a and lens array 4a relative to base 6a for each particular bacterial, mold or yeast culture. In a more preferred embodiment of the present invention, a first calibration run of is carried out during the training of the algorithm. In this way, optimal light intensity and color peak is obtained for each sample.

The invention claimed is:

1. A device suitable for the acquisition of hyperspectral images of bacterial, mold or yeast colonies in Petri dishes, the device comprising:
   - a light housing with an upward oriented annular light source arranged to illuminate an entire interior of a Petri dish,
   - camera capable of hyperspectral image acquisition equipped with a hole inspection lens array for imaging inner walls and bottom surfaces of cavities,
   - said lens array and camera are oriented upwards and positioned within the light housing such that a distal end of the lens array is below the upper surface of the light housing,
   - and said light housing having an upper surface equipped with a base configured to receive said Petri dish in an inverted top-down orientation preventing condensation interference with optical imaging.

2. The device according to claim 1, wherein, the base is provided with both round and square shaped cavities on its surface.

3. The device according to claim 2, wherein, the round and square shaped cavities on the surface of the base are in substantial alignment with the light source, lens array and camera.

4. The device according to claim 2, wherein the square and round cavities are provided in different sizes.

5. The device according to claim 4, wherein, the square and round cavities are provided in a stepped construction, descending from largest to increasingly smaller apertures.

6. The device according to previous claim 5, wherein, the inner perimeter of each step is chamfered.

7. The device according to claim 5, wherein, the light source is in sliding attachment relative to the lens array.

8. A device according to claim 1, wherein, the light source has a circular disposition around with the optical axis of the hole inspection lens assembly.

9. The device according to claim 1, wherein, lens array and camera are in slidable attachment with the light housing.

10. A method for the detection identification and monitoring of bacteria, mold or yeast colonies inside a petri dish comprising
    - setting a sampling frequency,
    - initial irradiation of bacterial, mold or yeast cultures with a light source and capturing of hyperspectral data employing the device as claimed in claim 1,
    - followed by data classification and storage, wherein, classification of bacterial, mold or yeast colonies is carried out using a decision model using a deep learning algorithm,
    - said algorithm includes a step of training the algorithm by means of a training dataset, which dataset includes a number of pre-classified samples containing a types of bacteria, mold and/or yeast.

11. The method according to previous claim 10, wherein, the training dataset includes samples with combinations of the bacteria, mold or yeast types with different types of growth medium.

12. The method according to claim 11, wherein the deep learning algorithm recognizes, counts and classifies a colony through a time lapse and within a 400 nm and 1700 nm bandwidth.

13. The method according to claim 10, wherein the training dataset includes samples combining multiple bacterial cultures and/or molds and/or yeast.

14. The method according to claim 10, wherein the hyperspectral images of each training sample are provided to the algorithm in the form of hyperspectral cubes, wherein each pixel comprising the image is assigned a spectrum.

15. The method according to claim 10, wherein an acquisition interval for the hyperspectral images can be determined either by the operator or by software.

16. The method according to claim 10, wherein classification of each hyperspectral data sample is classified and stored based on the light bandwidth of said sample.

17. The method according to claim 16, characterized in that, changes in the spectrum of a pixel denotes a change in the types of bacteria, mold or yeast present in said pixel.

18. The method according to claim 17, characterized in that, once each pixel of a sample has been analyzed, the number of pixels where each detected bacteria, mold or yeast have been detected are counted.

* * * * *